United States Patent
Bharaj et al.

(10) Patent No.: US 6,806,611 B2
(45) Date of Patent: Oct. 19, 2004

(54) STATOR ASSEMBLY FOR ELECTRICAL MACHINES AND METHOD OF MAKING THE SAME

(75) Inventors: Rajinder S. Bharaj, Tucson, AZ (US); Gerald Rosul, Tucson, AZ (US); Gregor McDowall, Tucson, AZ (US)

(73) Assignee: Honeywell International, Inc., Morristown, NJ (US)

( * ) Notice: Subject to any disclaimer, the term of this patent is extended or adjusted under 35 U.S.C. 154(b) by 177 days.

(21) Appl. No.: 10/075,894

(22) Filed: Feb. 13, 2002

(65) Prior Publication Data

US 2003/0151325 A1 Aug. 14, 2003

(51) Int. Cl.⁷ ............................................... H02K 3/04
(52) U.S. Cl. ...................... 310/208; 310/179; 310/201
(58) Field of Search ............................... 310/208, 184, 310/201, 179, 260, 270, 180, 202–205, 210, 198, 207

(56) References Cited

U.S. PATENT DOCUMENTS

| | | | |
|---|---|---|---|
| 3,746,899 A | 7/1973 | Eastham | 310/12 |
| 3,975,668 A | 8/1976 | Davie | 318/212 |
| 4,037,126 A | 7/1977 | Brennan et al. | 310/260 |
| 4,052,783 A | 10/1977 | Shively | 250/493 |
| 4,450,708 A | 5/1984 | King | 72/481 |
| 4,739,643 A | 4/1988 | Kuriyama et al. | 72/306 |
| 4,833,356 A | 5/1989 | Bansal et al. | 310/207 |
| 5,714,824 A * | 2/1998 | Couture et al. | 310/208 |
| 5,926,940 A | 7/1999 | Toh et al. | 119/57.9 |
| 5,955,810 A * | 9/1999 | Umeda et al. | 310/208 |
| 5,994,813 A | 11/1999 | Umeda et al. | 291/546 |
| 6,049,154 A * | 4/2000 | Asao et al. | 310/201 |
| 6,107,718 A | 8/2000 | Schustek et al. | 310/218 |
| 6,157,109 A | 12/2000 | Schiferl et al. | 310/254 |
| 6,313,556 B1 | 11/2001 | Dombrovski et al. | 310/91 |
| 6,313,559 B1 | 11/2001 | Kusase et al. | 310/254 |
| 6,376,961 B2 * | 4/2002 | Murakami et al. | 310/184 |
| 6,501,205 B1 * | 12/2002 | Asao et al. | 310/184 |
| 6,525,443 B2 * | 2/2003 | Asao | 310/201 |

* cited by examiner

Primary Examiner—Joseph Waks
Assistant Examiner—Leda Pham
(74) Attorney, Agent, or Firm—Douglas A. Mullen, Esq.

(57) ABSTRACT

A stator for a rotating electrical machine, such as a motor or generator, is wound with stator coils having non-slot-insertion segments that include a twisted segment that is twisted a predetermined number of degrees. The twisted segment is additionally bent at a predetermined angle relative to a reference plane. This combination of twist and bend reduces the likelihood of damage to the insulating coating on the stator coils, and increases the clearance between adjacent coils as compared to other stator designs. As a result, electrical interference between adjacent coils is minimized.

20 Claims, 6 Drawing Sheets

STATOR ASSEMBLY FOR ELECTRICAL MACHINES AND METHOD OF MAKING THE SAME

BACKGROUND OF THE INVENTION

The present invention relates to rotating electrical machines and, more particularly, to a stator used in rotating electrical machines having an improved stator coil end turn configuration.

Aircraft systems include various types of rotating electrical machines, such as alternating current (AC) motors and generators of various designs. Generally, an AC machine includes a rotor and a stator. If the machine is operated as a motor, electrical power is supplied to the stator to develop a rotating electrical field. This rotating electrical field generates a torque in the rotor causing it to rotate. If the machine is operated as a generator, electrical power is supplied to the rotor to generate a magnetic field. A prime mover is coupled to the rotor causing it, and thus the generated magnetic field, to rotate. This rotating magnetic field induces a voltage into the stator, which supplies electrical power to a load.

A stator for AC machines may typically include a stator core having a plurality of wire coils wound around it. The stator core is generally formed by laminating a plurality of ring plates, and includes an inner circumference having a plurality of slots that extend along its axis. In some stator designs, the wire coils are coated with an electrically insulating enamel, and are wound around the stator core by inserting a portion of each coil into, and through, two of the slots. Thus, with this design, each of the wire coils includes two slot-insertion segments that are inserted in, and pass through, separate slots in the stator core, and a non-slot-insertion segment that extends away from the end of the stator core. The non-slot-insertion segments are used to transfer electrical energy to or from the stator, depending upon the machine's application as a motor or generator. As a result, preventing electrical interference between the individual wire coils is generally desired.

One way of preventing electrical interference between adjacent stator coils is to include a knuckle bend on the non-slot-insertion segments to provide sufficient spacing between adjacent coils. However, in some cases it has been found that the insulating enamel applied to the wire coils cracks over time because of the tight radius of the knuckle bend. With cracks in the insulating coating, electrical interference between the coils can occur. Also, when the stator exudes heat during operation, the likelihood of the enamel peeling off increases if there is a crack. Similarly, electrical interference is increased in this case as well. Moreover, the knuckle bend in some instances exceeds manufacturing tolerances, which can lead to premature failures. In addition, the length of the non-slot-insertion segments in current stator coils adds to the overall electrical resistance of the stator, which can adversely affect the overall efficiency of the electrical machine.

Therefore, there is a need for a stator that decreases the likelihood of electrical interference between stator coils, that decreases the likelihood for a mechanical failure of the stator coils, and that increases the overall efficiency of the electrical machine into which it is installed. The present invention addresses one or more of these needs.

SUMMARY OF THE INVENTION

The present invention provides a stator core that not only increases machine efficiency, but has an increased life. Additionally, the present invention decreases the likelihood of electrical interference between the coils.

In one embodiment of the present invention, and by way of example only, a stator for a rotating electrical machine includes a stator core, at least two longitudinal slots, and at least one stator coil. The stator core has an outer circumferential surface and an opening therethrough that forms an inner circumferential surface. The longitudinal slots are formed in the inner circumferential surface of the stator core. The stator coil has a first slot-insertion segment and a second slot-insertion segment interposed by a non-slot-insertion segment. The first and second slot-insertion segments extend parallel to one another in a first plane and are inserted, one each, within a separate slot. The non-slot-insertion segment has a first non-twisted segment and a second non-twisted segment interposed by a twisted segment. The twisted segment is twisted a predetermined number of degrees and includes at least a portion thereof that is bent at a predetermined angle relative to a second plane that is parallel to the first plane.

In another exemplary embodiment, a stator for a rotating electrical machine includes a stator core, at least two longitudinal slots, and at least one stator coil. The stator core has an outer circumferential surface and an opening therethrough that forms an inner circumferential surface. The longitudinal slots are formed in the inner circumferential surface of the stator core. The stator coil has a first slot-insertion segment and a second slot-insertion segment interposed by a generally V-shaped non-slot-insertion segment. The first and second slot-insertion segments extend parallel to one another in a first plane and are inserted, one each, within a separate slot. The non-slot-insertion segment has an apex formed thereon at a predetermined position, and the apex is bent at a predetermined angle relative to a second plane that is parallel to the first plane, and includes at least a portion therof that is twisted a predetermined number of degrees.

In still another exemplary embodiment, a rotating electrical machine includes a rotationally mounted rotor and a stator. The stator surrounds the rotor and includes a stator core, at least two longitudinal slots, and at least one stator coil. The stator core has an outer circumferential surface and an opening therethrough that forms an inner circumferential surface. The longitudinal slots are formed in the inner circumferential surface of the stator core. The stator coil has a first slot-insertion segment and a second slot-insertion segment interposed by a non-slot-insertion segment. The first and second slot-insertion segments extend parallel to one another in a first plane and are inserted, one each, within a separate slot. The non-slot-insertion segment has a first non-twisted segment and a second non-twisted segment interposed by a twisted segment. The twisted segment is twisted a predetermined number of degrees and includes at least a portion thereof that is bent at a predetermined angle relative to a second plane that is parallel to the first plane.

Other independent features and advantages of the preferred stator will become apparent from the following detailed description, taken in conjunction with the accompanying drawings which illustrate, by way of example, the principles of the invention.

DETAILED DESCRIPTION OF VARIOUS EMBODIMENTS

Figure 1:
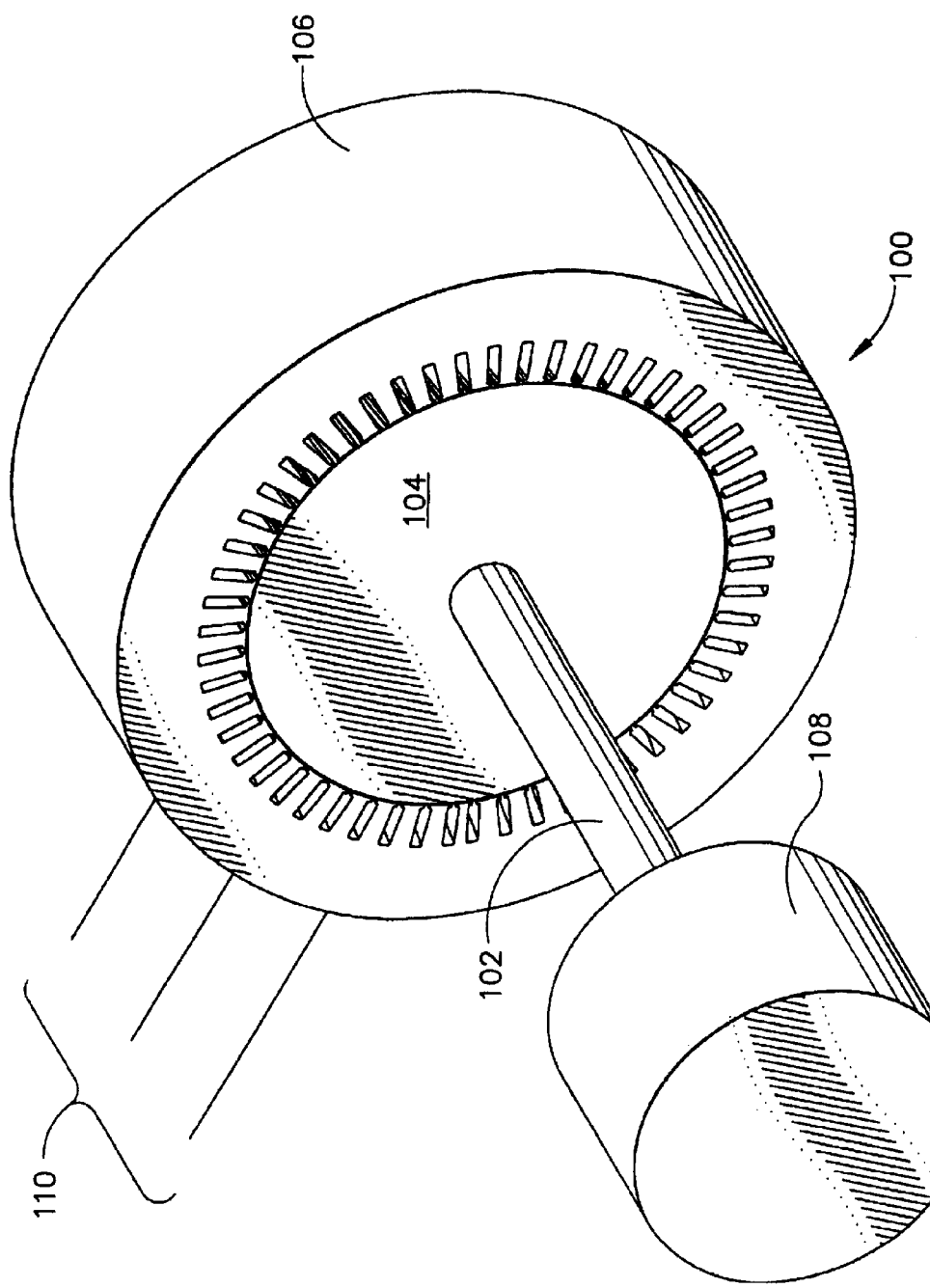
FIG. 1 is a simplified mechanical schematic representation of a rotating electrical machine.

A simplified mechanical schematic representation of a generalized embodiment of an AC machine 100 is depicted in FIG. 1. The machine 100 may be either an AC motor or an AC generator, and includes a shaft 102, a rotor 104, and a stator 106. A device 108 is coupled to the shaft 102. If the AC machine 100 is a generator, the device 108 is a prime mover for rotating the shaft 102 and the electrical power generated in the stator 106 is delivered to a load via a set of leads 110 that are coupled to each of the stator windings. If the AC machine 100 is a motor, the device 108 is a load to be rotated by the shaft 102 and power is supplied to the stator 106 from a source (not shown) via the leads 110.

Figure 2:
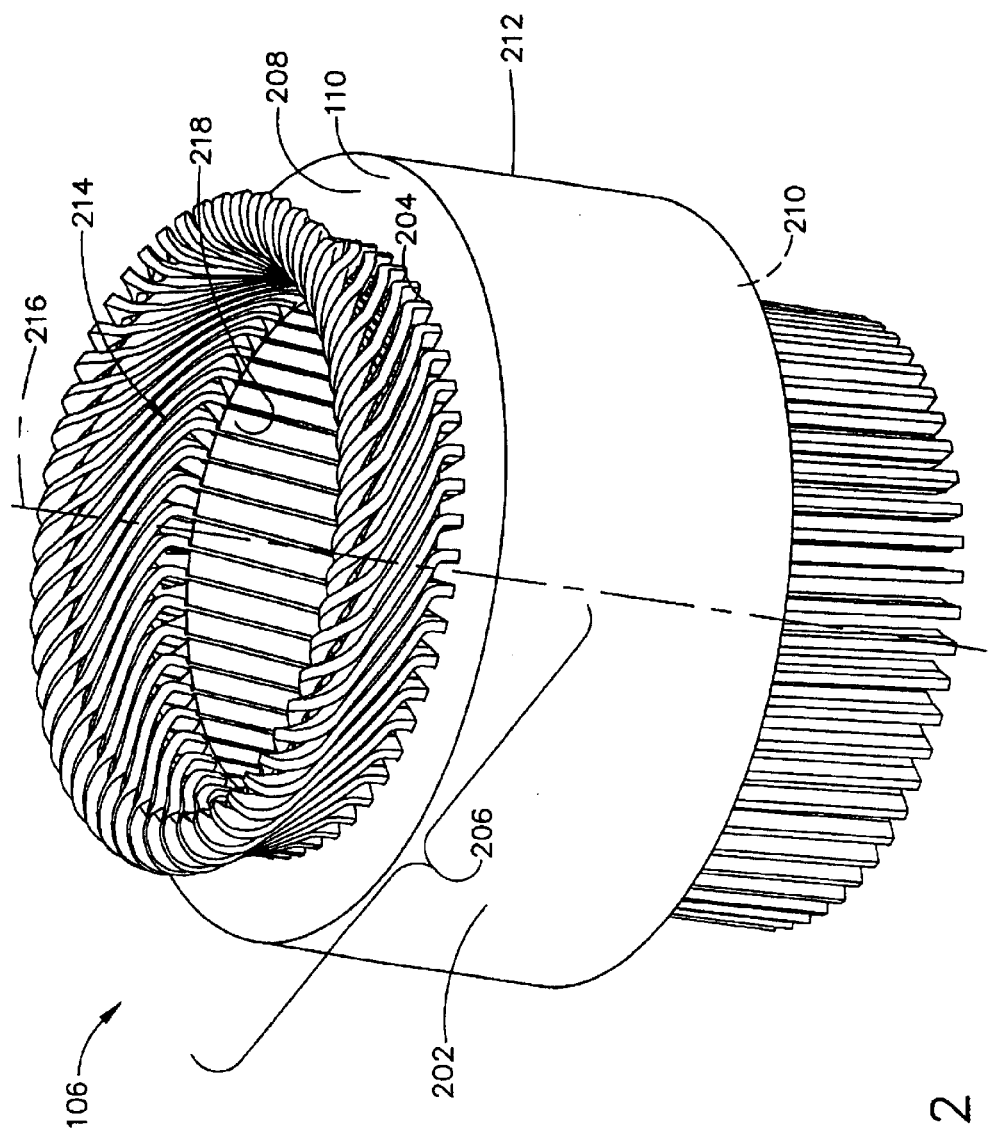
FIG. 2 is a perspective view of a main stator according to an exemplary embodiment of the present invention that may be used in the machine of FIG. 1.

Turning now to FIG. 2, which provides a perspective view of the stator 106 according to an exemplary embodiment of the present invention that may be installed in the machine depicted in FIG. 1, a detailed description of the stator will be provided. As shown in the figure, the stator 106 includes a stator core 202 having a plurality of slots 204, and a plurality of stator coils 206. The stator core 202 is preferably formed from a plurality of laminations, and is preferably cylindrically shaped. It will be appreciated that the stator core 202 need not be formed from individual laminations, but could also be formed of a single, cast piece. The stator core 202 has a first end 208, a second end 210, an outer circumferential surface 212, and an opening 214 that extends through it along an axis 216, thereby forming an inner circumferential surface 218. It is noted that the stator core 102 may be formed of any one of numerous known materials known in the art including, but not limited to, electrical-grade steels such as cobalt-iron and silicon-iron. However, in a preferred embodiment the stator core 202 is formed of cobalt-iron.

Each of the plurality of slots 204 is formed on the inner circumferential surface 218. The slots 204 preferably extend longitudinally between the first 208 and second 210 ends of the stator core 202, and are preferably evenly spaced around the inner circumferential surface 218. In addition, each of the slots 204 is radially sized to receive two stator coils 204, one in an inner slot position and one in an outer slot position. The skilled artisan will appreciate that this slot configuration is merely exemplary of a preferred embodiment and that other slot configurations may be used. The stator coils 206 are wound around the stator core 202 by inserting two segments of each coil 206 into two separate slots 204. The slots 204 that each coil 206 is inserted into are preferably non-adjacent, though it will be appreciated that the present invention is not limited to this scheme.

Figure 4:
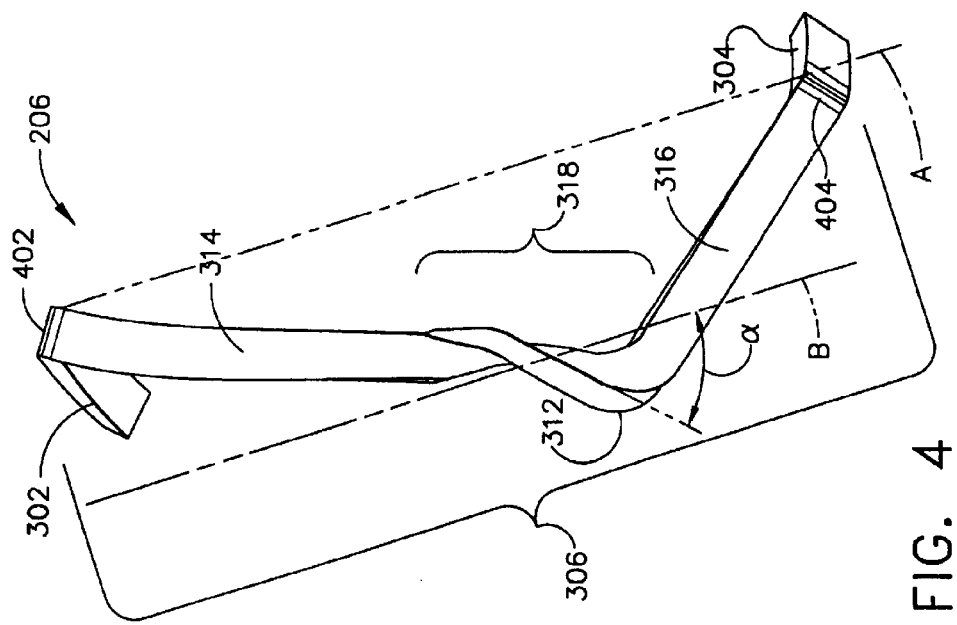
FIG. 4 is a top view of the winding coil depicted in FIG. 3.
Figure 3:
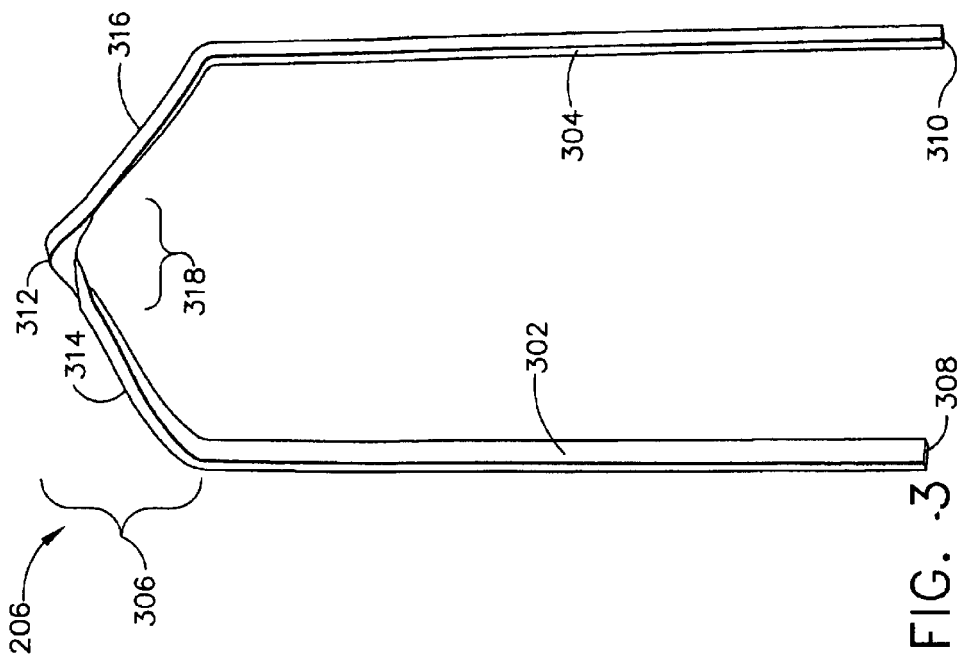
FIG. 3 is a side view of a winding coil according to an exemplary embodiment of the present invention that may be used in the stator of FIG. 2.
Figure 5:
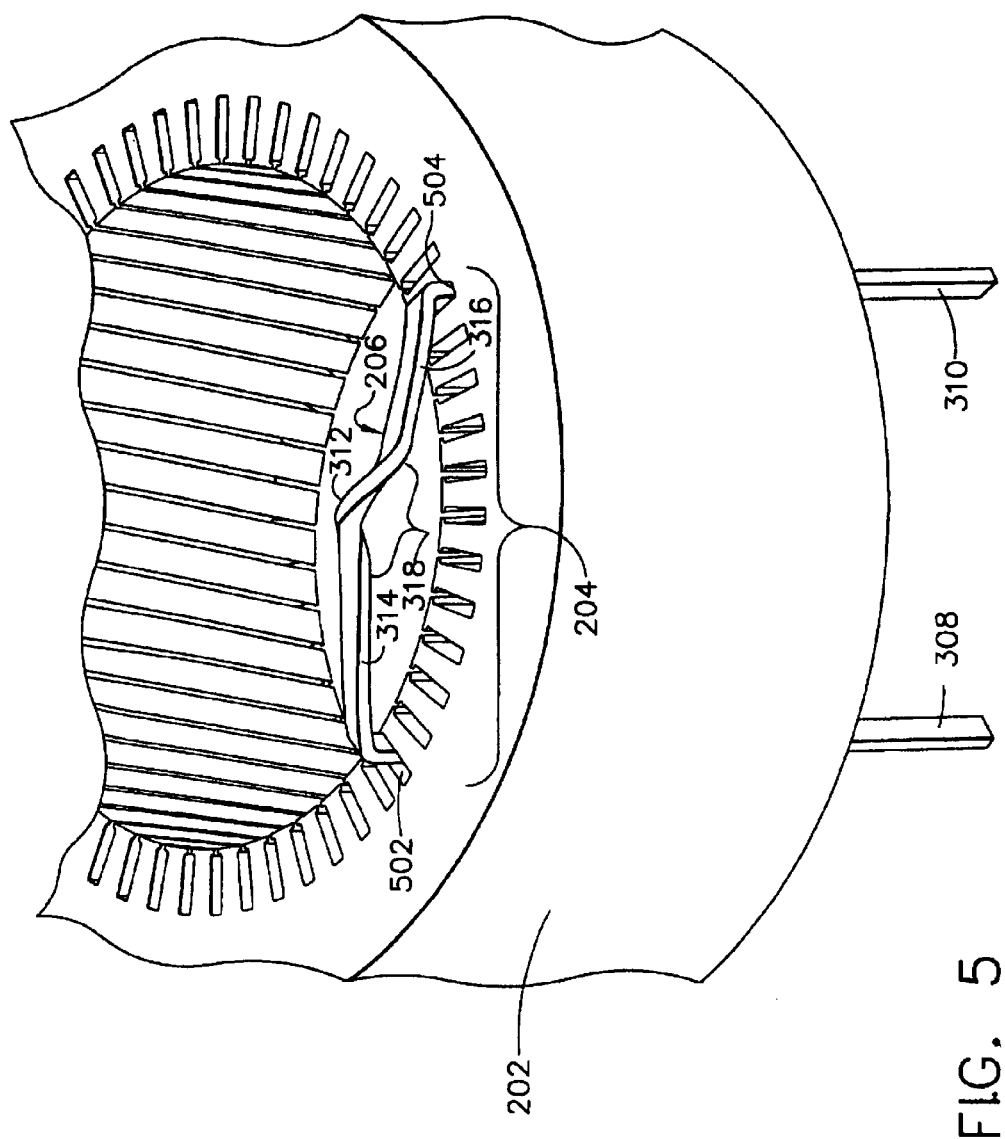
FIG. 5 is a perspective view of a portion of a stator core with a single winding coil.

Turning now to FIGS. 3 and 4 in combination, a more detailed description of the stator coils 206 will be provided. Each stator coil 206 is made from a conductive metal, such as copper, and is preferably rectangular in cross section. It will be appreciated that these are only exemplary of a preferred embodiment, and that the coils 206 could be constructed of other conductive metals, such as aluminum, gold, and silver, and could have other cross sectional shapes, such as round or square. Moreover, each coil 206 could be constructed of a single conductor, or a plurality of conductors. In any case, as FIGS. 3 and 4 depict, each stator coil 206 includes two substantially straight segments 302, 304 interposed by a generally V-shaped segment 306. The substantially straight segments 302, 304 extend parallel one to another in a first plane A, and preferably, though not necessarily, have substantially equivalent lengths. At least a portion of each of these substantially straight segments 302, 304 is inserted into separate slots 204 in the stator core 202. Thus, these segments are referred to hereafter as first 302 and second 304 slot-insertion segments. In addition, with reference back to FIG. 1, the first 302 and second 304 slot-insertion segments have first 308 and second 310 ends, respectively, that extend out the second end 210 of the stator core 204. These ends are used to electrically couple selected coils 206 together into groups, as is generally known in the art.

The generally V-shaped segment 306 is not inserted into a slot 204, and is therefore referred to as a non-slot-insertion segment throughout the remainder of the description. As shown more particularly in FIG. 4, each coil 206 additionally includes at least two bends 402, 404 where the non-slot-insertion segment 306 and the slot-insertion segments 302, 304 meet. These bends 402, 404 extend the non-slot-insertion segment 306 away from the first plane A toward a second plane B, that is parallel to the first plane A. These bends 404, 404 provide the appropriate angle and spacing, and determine the total length of the non-slot-insertion segment 306. The non-slot-insertion segment 306, as noted above, is generally V-shaped, and has an apex 312 at a predetermined position along the non-slot-insertion segment 306. It is noted that the V-shape is merely exemplary of a preferred embodiment, and that the non-slot-insertion segment 306 could be formed into other shapes that are either symmetric or asymmetric about the apex 312.

The non-slot-insertion segment 306 additionally includes a first non-twisted segment 314 and a second non-twisted segment 316 interposed by a twisted segment 318. The twisted segment 318 is preferably at or near the apex 312 and is twisted a predetermined number of degrees. In addition to the twist of a predetermined number of degrees, the twisted segment 318 is also bent at a predetermined angle ($\alpha$) relative to the second plane B, as shown more clearly in FIG. 4. While the predetermined number of degrees of twist and the predetermined angle ($\alpha$) may be any one of numerous degrees, it is noted that in the preferred embodiment, the twisted segment 318 is twisted approximately 180-degrees, and is bent approximately 45-degrees. This combination of degree of twist and angle of bend provides the maximum amount of clearance between adjacent coils 206. Thus, the likelihood of electromagnetic interference between adjacent coils is reduced. In addition, by providing each coil 206 with a twisted segment 318 having a predetermined degree of twist and being bent at a predetermined angle ($\alpha$), the non-slot-insertion segment 306 is shorter in length as compared to other designs. As a result, the overall electrical resistance of the stator coils 206 is reduced. Thus, the stator 106 experiences less power loss, which makes it more efficient.

Having described a preferred embodiment of the stator 106 from a structural standpoint, a method of assembling the stator 106 will now be described. In doing so, reference should now be made to FIGS. 5–8.

The stator core 106 is constructed by assembling the individual laminations together in a conventional manner.

The stator coils 206 are individually formed into the above-described configuration, and are coated with an electrically insulating coating, such as enamel. In addition to coating the coils 206, it will be appreciated that each of the slots 204 may also be coated with an electrically insulating material, such as, for example, Nomex® or Teflon®.

Figure 7:
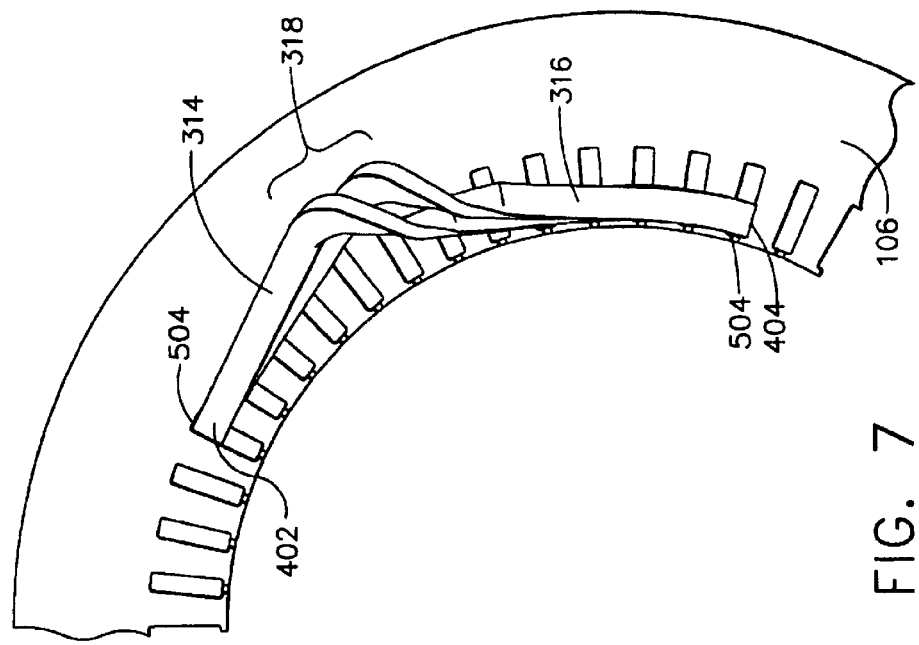
FIGS. 6–8 is are side, top, and perspective views, respectively, of portions of the stator core with two winding coils.
Figure 6:
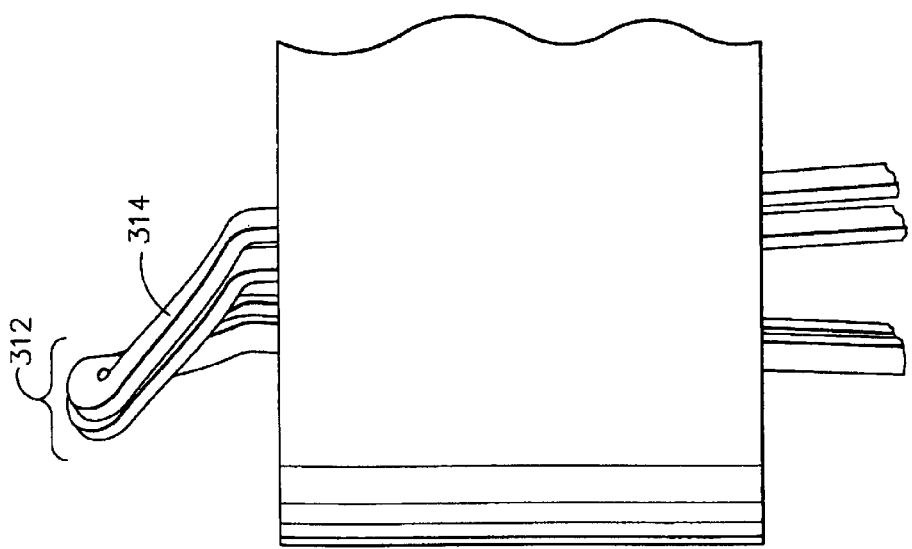
Figure 8:
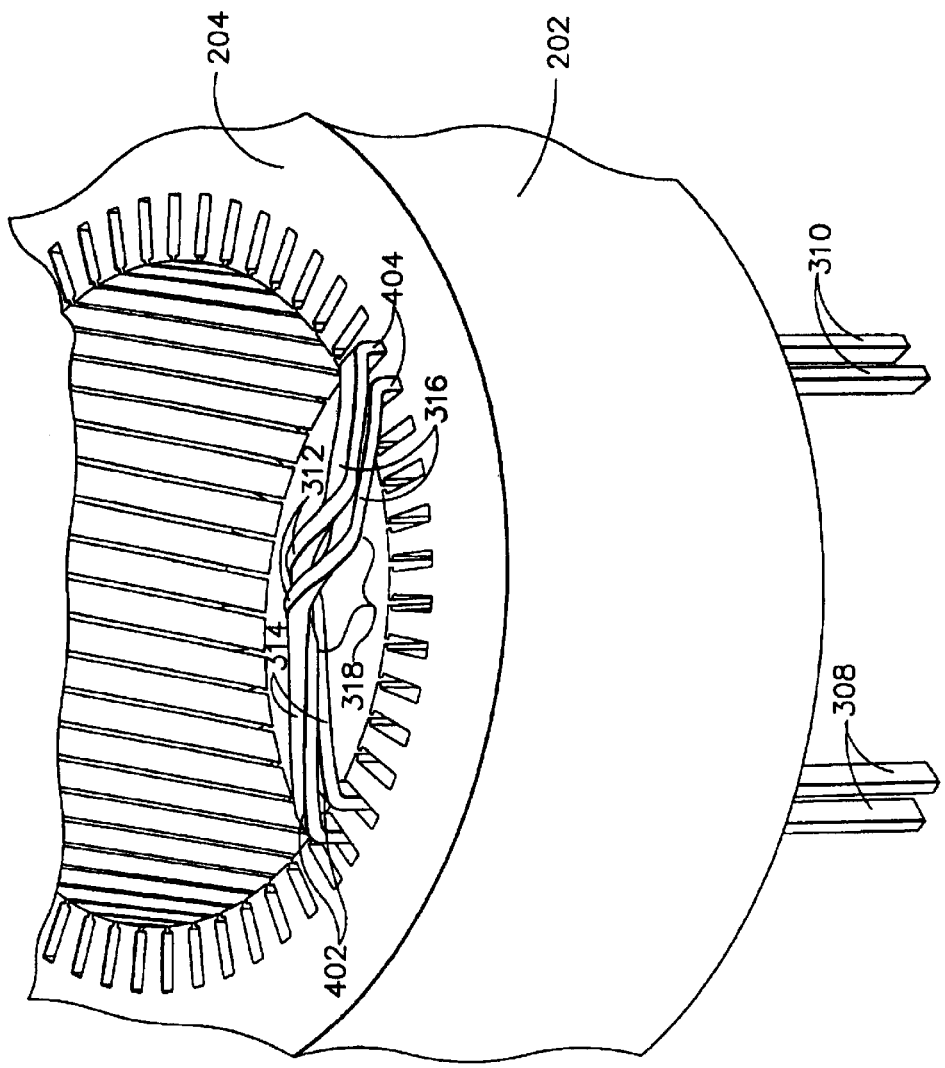

One of the coils 206 is then installed into the stator core 204 by inserting the first 302 and second 304 slot-insertion segments into separate slots 204. The skilled artisan will appreciate that the specific slots 204 into which the first 302 and second 304 slot-insertion segments are inserted are assigned as part of the electrical design of the machine. As was noted above, and shown more particularly in FIG. 5, one of the first 302 and second 304 slot-insertion segments of each coil 206 is inserted into an inner slot position 502 and the other is inserted into an outer slot position 504. Thereafter, as depicted in FIGS. 6–8, a second coil 206 is installed in the stator core 204 in a similar fashion. This process is repeated until all of the stator coils 206 are installed, providing the configuration depicted in FIG. 1.

Once all of the stator coils 206 are installed in the stator core 204, the first 308 and second 310 ends of the slot-insertion segments 302, 304 are selectively coupled together to form groups of coils. The skilled artisan will appreciate that the coils in each group may be coupled together in series, or in parallel, or in series-parallel, depending on the machine design. The skilled artisan will also appreciate that the coils 204 may be coupled together using any one of numerous known processes, such as, for example, soldering or brazing.

The stator of the present invention includes coils having, in combination, a predetermined of degree of twist and a predetermined angle of bend. This combination provides the maximum amount of clearance between adjacent coil, which reduces the likelihood of electromagnetic interference between adjacent coils. In addition, this combination of twist and bend allows the non-slot-insertion segment to be shorter as compared to other designs. As a result, the overall electrical efficiency of the stator is improved.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A staler for a rotating electrical machine, comprising:
   a stator core having an outer circumferential surface and an opening therethrough that forms an inner circumferential surface;
   at least two longitudinal slots formed in the inner circumferential surface of the stator core; and
   at least one stator coil having a first slot-insertion segment and a second slot-insertion segment interposed by a non-slot-insertion segment, the first and second slot-insertion segments extending parallel to one another in a first plane and inserted, one each, within a separate slot, the non-slot-insertion segment having non-twisted apex at a predetermined position thereon, and a first non-twisted segment and a second non-twisted segment interposed by a twisted segment, the first and second non-twisted segments each having a non-twisted section adjacent the first and second slot-insertion segments, respectively,
   wherein the twisted segment is twisted a predetermined number of degrees and includes at least a portion thereof that is bent at a predetermined angle relative to a second plane that is parallel to the first plane.

2. The stator of claim 1, wherein the non-slot-insertion segment is generally V-shaped.

3. The stator of claim 2, wherein the non-twisted apex is located on the twisted segment.

4. The stator of claim 1, wherein the non-slot-insertion segment extends in a direction away from the first and second slot-insertion segments generally toward the outer circumference of the stator core.

5. The stator of claim 1, wherein the predetermined number of degrees of the twist is approximately 180°.

6. The stator of claim 1, wherein the predetermined angle of bend is approximately 45°.

7. A rotating electrical machine, comprising:
   a rotationally mounted rotor; and
   a stator surrounding the rotor, the stator including:
      a stator core having an outer circumferential surface and an opening therethrough that forms an inner circumferential surface,
      at least two longitudinal slots formed in the inner circumferential surface of the stator core, and
      at least one stator coil having a first slot-insertion segment and a second slot-insertion segment interposed by a non-slot-insertion segment, the first and second slot-insertion segment extending parallel to one another in a first plane and inserted, one each, within a separate slot, the non-slot-insertion segment having, a non-twisted apex and a first non-twisted segment and a second non-twisted segment interposed by a twisted segment, the first and second non-twisted segments each having a non-twisted section adjacent the first and second slot-insertion segments, respectively,
      wherein the twisted segment is twisted a predetermined number of degrees and includes at least a portion thereof that is bent at a predetermined angle relative to a second plane that is parallel to the first plane.

8. The machine of claim 7, wherein the non-slot-insertion segment is generally V-shaped.

9. The machine of claim 8, wherein the non-twisted apex is located on the twisted segment.

10. The machine of claim 7, wherein the non-slot-insertion segment extends in a direction away from the first and second slot-insertion segments generally toward the outer circumference of the stator core.

11. The machine of claim 7, wherein the predetermined number of degrees of the twist is approximately 180°.

12. The machine of claim 7, wherein the predetermined angle of bend is approximately 45°.

13. The machine of claim 7, wherein the machine is configured as a generator.

14. The machine of claim 7, wherein the machine is configured as a motor.

15. A coil for insertion into a stator core, comprising:
   a first slot-insertion segment extending in a first plane;
   a second slot-insertion segment extending parallel to the first slot-insertion segment in the first plane; and
   a non-slot-insertion segment coupled to the first and second slot-insertion segments together, the non-slotinsertion segment having a non-twisted apex, and a first non-twisted segment and a second non-twisted segment interposed by a twisted segment, the first and second non-twisted segments each having a non-twisted section adjacent the first and second slot-insertion segments, respectively, wherein the twisted segment is twisted a predetermined number of degrees and includes at least a portion thereof that is bent at a predetermined angle relative to a second plane that is parallel to the first plane.

16. The coil of claim 15, wherein the non-slot-insertion segment is generally V-shaped.

17. The coil of claim 16, wherein the non-twisted apex is located on the twisted segment.

18. The coil of claim 15, wherein the non-slot-insertion segment extends in direction away from the first and second slot-insertion segments.

19. The coil of claim 16, wherein the predetermined number of degrees of twist is approximately 180°.

20. The coil of claim 17, wherein the predetermined angle of the bend is approximately 45°.

* * * * *